June 24, 1969 C. E. G. LUNDGREN ET AL 3,451,674
ERGOMETER
Filed Dec. 20, 1965
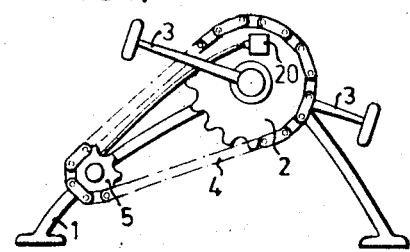
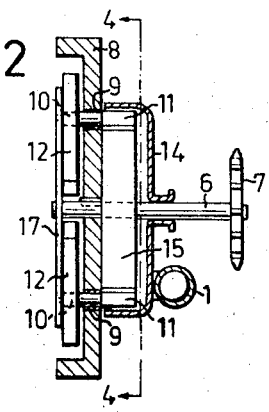
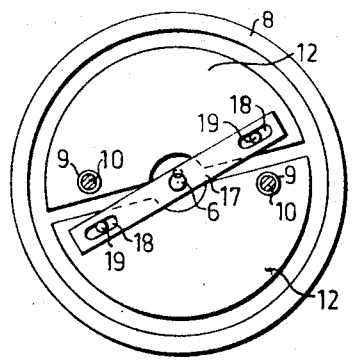
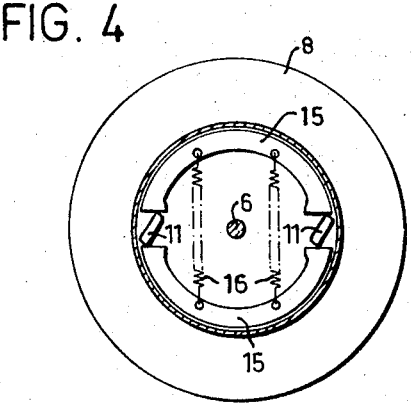
INVENTORS
CLAES ERIK GUNNAR LUNDGREN
ISTVAN JANOS ANTAL LICHTNECKERT
BY
Young & Thompson
ATTYS.

United States Patent Office 3,451,674
Patented June 24, 1969

3,451,674
ERGOMETER
Claes Erik Gunnar Lundgren and Istvan Janos Antal Lichtneckert, Lund, Sweden, assignors to AB Cykelfabriken Fram, Uppsala, Sweden
Filed Dec. 20, 1965, Ser. No. 514,924
Int. Cl. A63b 21/22, 23/04
U.S. Cl. 272—73    3 Claims

ABSTRACT OF THE DISCLOSURE

An ergometer for muscular exercise having a brake and a driving mechanism. The brake includes a drum secured to a stationary frame and rotary brake shoes for cooperation with the drum. The driving mechanism includes a shaft journalled centrally in the drum for rotating the brake shoes and a flywheel keyed to the shaft, the cam members being rotatably journalled in the flywheel eccentrically of the shaft and centrifugal weights being keyed to the cam members to turn the cam members for setting the brake shoes into braking contact with the drum in response to the centrifugal force generated upon rotation of the shaft. The weights are disposed symmetrically with respect to the shaft and are interconnected by a lever pivoted to the shaft whereby the force of gravity will act equally on the weights during rotation.

---

In conventional types of ergometer devices the power output increases substantially linearly with the displacement (number of muscular contractions). Variations of the power output are usually effected, in addition to variation of the speed, by manual adjustment of the brake power. In the application of such devices it is very difficult to imitate the physical stresses resulting from physical activities of the body involving a power output that increases progressively with increasing speed (number of muscular contractions per unit of time) such as in cycling, swimming, rowing and the like. In training for such activities the present invention renders possible imitation of the natural stresses.

A method of form-building exercise more and more recommended by medical science is the so-called discontinuous training which means alternating comparatively hard work with idle periods of the order of one minute. It has proved to be favourable during the idle periods to keep on with slow movements without resistance in order to promote removal of metabolic products out of the musculature by using the so called venose pump (massaging action of the muscles on the blood vessels). In conventional ergometer devices this method requires the user to release and reengage the brake device for the alternating periods which means time-wasting and inconvenient operations.

The object of this invention is to eliminate the above inconveniences. In an ergometer according to the invention and comprising a stationary frame use is made of a brake comprising surface-frictionally operating brake members, such as brake shoes, and a brake drum. In its broadest aspect the invention is characterized in that the brake members are connected with the driving mechanism, such as a crank mechanism, of the ergometer in a manner such that upon actuation of the driving mechanism said members, in cooperation with the brake drum, produce a braking torque that increases with increasing driving speed. Due to this arrangement the conditions in ordinary cycling, swimming and the like are imitated and in addition low load idle periods can be obtained in a simple manner, it being sufficient to lower the speed during the idle periods resulting in a tolerably low braking action.

In order to obtain a braking action that increases with increasing speed it might be conceivable to suspend the brake members eccentrically with respect to the axis of rotation so that said members will be deflected during rotation so as to be forced against the frictional lining of the brake drum. However, such arrangements result in irregular wear of the brake shoes. Therefore it is suitable to provide separate eccentric masses which actuate the brake shoes.

Additional features of the invention will appear from the following description of an embodiment illustrated in the annexed drawing. FIG. 1 is a diagrammatic lateral view of the entire ergometer device. FIG. 2 is an axial sectional view of a brake and flywheel system comprised in the ergometer. FIG. 3 illustrates a flywheel including eccentric masses viewed from the left in FIG. 2, and FIG. 4 is a cross-sectional view along the line 4—4 in FIG. 2.

Referring to FIG. 1, a frame 1 carries a driving device in the form of a conventional bicycle crank hub with appertaining sprocket wheel 2 and bicycle cranks 3. By means of a bicycle chain 4 the sprocket wheel 2 is positively connected to a combined brake and inertia system 5 which is mounted in a hub on the frame 1.

FIG. 2 illustrates details of the brake and inertia system. Reference numeral 6 denotes a shaft, one end of which is secured to a sprocket wheel 7 for the chain 4. The other end of shaft 6 extends through an inertia member or flywheel 8 which is keyed to the shaft. As will be seen from FIGS. 2 and 3, the flywheel 8 has two diametrically opposite holes 9 with bearings for two spindles 10. One end of each spindle is in the form of a brake cam 11 and the other end is rigidly secured to a preferably metallic weight or plate 12 serving as an eccentric mass. The spindles 10 are eccentric relative to the shaft 6, FIG. 3. The brake cam end 11 of each spindle 10 is directed against a brake drum 14 secured to the tubular frame 1. Tension springs 16 act to bias the brake shoes 15 housed within the brake drum 14 against the brake cams 11. FIG. 3 illustrates a two-armed symmetric lever 17 which is rotatably mounted on the end of the shaft 6 that projects out of the flywheel 8 between the metallic plates 12. Each of the arms of the lever 17 has a longitudinal slot 18 which acts to guide a pin 19 secured to the plate 12 near the straight edge thereof. A transmitter for a revolution counter 20 shown in FIG. 1 may be mounted on the shaft 6 in a conventional manner.

The mode of operation is as follows:

If the sprocket wheel 2 is rotated by means of the bicycle crank 3, the motion is transmitted, via the chain 4 and the sprocket wheel 7, to the shaft 6, flywheel 8, plates 12, spindles 10, brake shoes 15 and lever 17. The centrifugal force due to the rotation tends to turn the plates 12 outwards about their respective spindles 10 which act as pivots. The spindles are turned in their bearings 9, with the result that the brake cams 11 are turned and move the brake shoes 15 into engagement with the brake drum 14 whereby to effect a braking action. Upon increasing speed the centrifugal force and consequently the brake power are increased. The action which the force of gravity exerts on the plates 12 and which is most pronounced when the centres of gravity of the plates are in the same horizontal plane as their pivots and which would result in that the brake shoe associated with the lower plate would be subjected to a greater braking force than the upper one, is balanced out by the action of the lever 17.

What we claim is:

1. An ergometer for muscular exercise, comprising a stationary frame, a brake including a drum secured to the frame and rotary brake shoes for cooperation with said drum, and a driving mechanism comprising a shaft journalled centrally in said drum for rotating said rotary brake shoes and an inertia member fixed to the shaft, cam members rotatably journalled in said inertia member eccentrically of said shaft and centrifugal masses in the form of weights fixed to said cam members to turn the cam members for moving the brake shoes into braking contact with the drum in response to the centrifugal force exerted by said weights on said cams as a result of rotating the shaft, said weights being disposed symmetrically with respect to the shaft, and a lever means pivoted to the shaft and interconnecting said weights to cause the force of gravity to act equally on the weights irrespective of their relative position during rotation.

2. An ergometer as claimed in claim 1, said weights being disposed on one side of said inertia member and said brake shoes being disposed on the other side of said inertia member, said cams being in the form of short shafts fixed at one end to said weights and having cam surfaces at the other end that act against said brake shoes.

3. An ergometer as claimed in claim 1, and lost-motion connections between said lever and said weights.

References Cited

UNITED STATES PATENTS

| | | | |
|---|---|---|---|
| 217,030 | 7/1879 | Weston | 188—184 |
| 603,363 | 5/1898 | Ireland | 188—184 |
| 988,464 | 4/1911 | Hallot | 188—184 |
| 1,315,875 | 9/1919 | Smythe | 188—184 |
| 2,181,359 | 11/1939 | Barrett | 188—184 |
| 2,196,360 | 4/1940 | Kamenarovic | 188—184 |
| 2,504,007 | 4/1950 | Declercq | 272—73 |
| 2,668,709 | 2/1954 | Boyko | 272—58 |
| 2,725,231 | 11/1955 | Hoover | 272—73 |

FOREIGN PATENTS

| | | |
|---|---|---|
| 863,469 | 1/1953 | Germany. |

ANTON O. OECHSLE, *Primary Examiner.*

R. W. DIAZ, *Assistant Examiner.*

U.S. Cl. X.R.

188—184